(12) United States Patent
Henderson et al.

(10) Patent No.: US 6,678,375 B1
(45) Date of Patent: Jan. 13, 2004

(54) EFFICIENT USE OF WIRE FOR DATA COMMUNICATION SYSTEMS

(75) Inventors: P. Michael Henderson, Tustin, CA (US); Sverrir Olafsson, Reykjavik (IS); Mickey Rushing, San Diego, CA (US); Joel D. Peshkin, Irvine, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/461,143

(22) Filed: Dec. 14, 1999

(51) Int. Cl.⁷ .................................................. H04M 1/00
(52) U.S. Cl. .............. 379/397; 379/399.01; 379/413.02
(58) Field of Search ..................... 379/387.01, 399.01, 379/413.02, 413.03, 402, 165, 171, 164, 198, 397

(56) References Cited

U.S. PATENT DOCUMENTS 5,887,054 A * 3/1999 Burke et al. ................. 379/159
6,546,098 B1 * 4/2003 Henderson ................... 379/397

OTHER PUBLICATIONS

Edge Publishing, "DSL Deployment Surges Well Beyond Projections; Grows 5 Times Faster Than Cable in 6–Month Time Period; Industry Trend or Event," Cambridge Telecom Report (Aug. 23, 1999).

Chowdhary, Sudhir, "Digital Subscriber Line (DSL): Widening The Superhighway," Computers Today (Sep. 30, 1999).

* cited by examiner

Primary Examiner—Rexford Barnie
(74) Attorney, Agent, or Firm—D'Aurelio & Mathews

(57) ABSTRACT

The present invention uses a wiring scheme for data transmission. The wiring scheme includes designating N–1 telecommunication wires and a common wire to each carry N–1 signals. The wiring scheme further includes designating one telecommunication wire, other than the N–1 telecommunication wires, as a common wire for each of the N–1 wires. In addition, the DC voltage polarities of at least one of the N–1 telecommunication wires may be reversed to reduce the likelihood of overloading the common wire. The wiring scheme may be utilized in the context of many data transmission systems including: POTS, PSTN, DSL, data modems, facsimile modems, and ISDN. The wiring scheme of the present invention may achieve higher data rates for data transmission.

18 Claims, 5 Drawing Sheets

EFFICIENT USE OF WIRE FOR DATA COMMUNICATION SYSTEMS

BACKGROUND OF THE INVENTION

1. Technical Field

The present invention relates generally to data communication systems and, more specifically, to the use of wires to support data transmission in a digital data communication system.

2. Background Art and Technical Problems

A number of data communication techniques may be utilized to provide digital data to consumers at high data rates. Such digital data may be associated with telephone, facsimile machine, video, audio, Internet, and other applications. In contrast to the traditional 4 kHz bandwidth telephone transmission system, digital data transmitted with other techniques can be used to convey a large amount of information in an efficient and accurate manner. Such digital data may be transmitted at high bit rates in accordance with any number of conventional methods and protocols, e.g., cable modem technology, fiber optic networks, Digital Subscriber Line (DSL) modem technology, Integrated Services Digital Network (ISDN) technology, wireless digital modem technology, and the like.

Most customer premises are merely wired to support plain old telephone service (POTS) transmissions. In the context of this description, "customer premises" may be a single family home, a multiple family building such as an apartment complex, an office building, or the like. For example, some conventional DSL circuits and traditional analog modems are provisioned over a single twisted pair of wires associated with a customer site. However, due to losses in the lines and crosstalk, it is often not possible to achieve data rates which the user desires over a single twisted pair circuit.

HDSL (High bit rate Digital Subscriber Line) applications often use a four wire system (i.e., two twisted pairs). Data transmission in an HDSL system is bidirectional and encoded differentially across each pair of wires, in order to achieve the desired data rates. In this respect, additional twisted pair circuits are used by bonding the circuits together in a manner called "inverse multiplexing." Inverse multiplexing involves apportioning the bits between the multiple circuits (e.g., the first bit travels down the first circuit path, the second bit travels down a second circuit path, and so on). Inverse multiplexing provides a link with increased capacity, such that very high data rates may be achieved. However, for each additional circuit path, an additional twisted pair of wires is required. In addition, the telephone company tariffs are for each twisted pair, making each additional twisted pair a financial consideration. Thus, because the supply of wires is often limited in a practical consumer application, the use of inverse multiplexing to increase data rates may be limited.

Prior methods of efficient and high speed data transmission to a customer premises have not adequately leveraged the wiring and architecture common to many customer premises (e.g., POTS), or developed improved wiring and architecture to support higher speed data transmission. Thus, a technique for exploiting wiring schemes for data transmission is needed which overcomes the shortcomings of the prior art.

SUMMARY OF THE INVENTION

In accordance with one aspect of the present invention, a more efficient use of data transmission wires to a customer premises is provided. A wiring scheme for using wires for data transmission supports N−1 circuits for N wires. Each circuit is capable of transmitting a different signal, e.g., a DSL transmission. The wiring scheme also designates one of the N wires as a common wire for each of the N−1 circuits. In addition, the voltage polarities on each of the N−1 circuits can be reversed to reduce the likelihood of overloading of the common wire. The wiring scheme of the present invention may be used to achieve higher data rates relative to conventional schemes that do not utilize a common wire for a plurality of circuits.

BRIEF DESCRIPTION OF THE DRAWING FIGURES

The subject invention will hereinafter be described in the context of the appended drawing figures, wherein like numerals denote like elements, and:

DETAILED OF DESCRIPTION OF A PREFERRED EMBODIMENT

Figure 1:
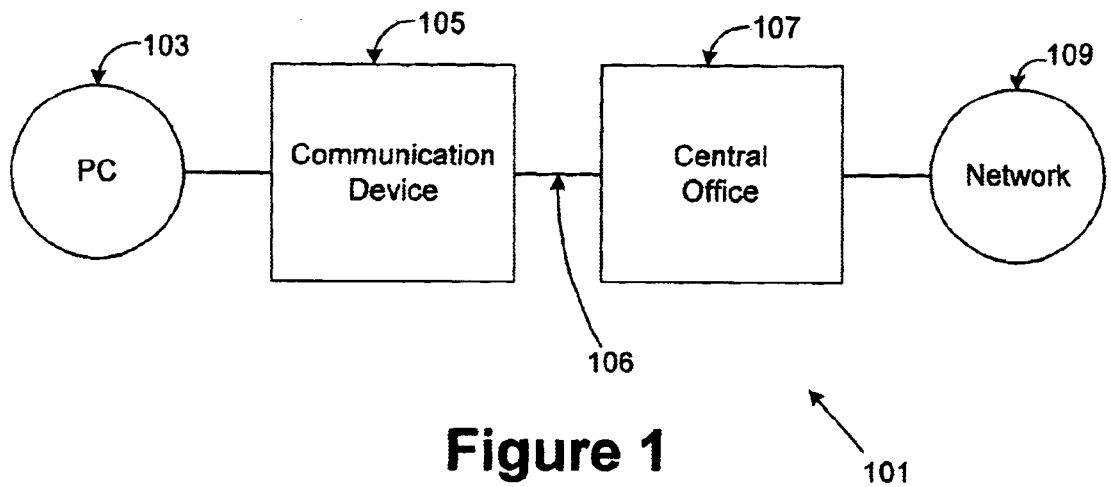
FIG. 1 is a block diagram illustrating a typical data transmission system.

Referring now to FIG. 1, a typical data transmission system 101 is illustrated in block diagram form. Data transmission system 101 includes a communication device 105, a central office 107, and a network 109. Data transmission system 101 communicates with a data source, such as a personal computer 103 to obtain digital data for transmission. Personal computer 103 is usually located at a customer premises, e.g., a person's house, and communication device 105 facilitates the transfer of data between personal computer 103 and central office 107 via an analog local loop 106. Central office 107 transmits data to network 109. In the context of this description, "customer premises" may be a single family home, a multiple family building such as an apartment complex, an office building, or the like. In addition, "central office" may be associated with a telephone company, any communications device, a network, or the like.

As discussed above, one application of the present invention is in a DSL system. However, the present invention is not limited to DSL or any specific modem system. The present invention may be equivalently extended for use in any number of communications systems, including in the context of POTS, PSTN (Public Switched Telephone Network), DSL, personal computer modem, facsimile modem, V.90 modem, cable modem, fiber optic networks, ISDN, LAN network, satellite data transmission, and wireless digital modem, among other applications. For example, the POTS communications system may be implemented at the customer premises by using an RJ-11 jack, or the DSL communications system may be implemented by using DSL modems at the customer premises and/or the central office.

Figure 2:
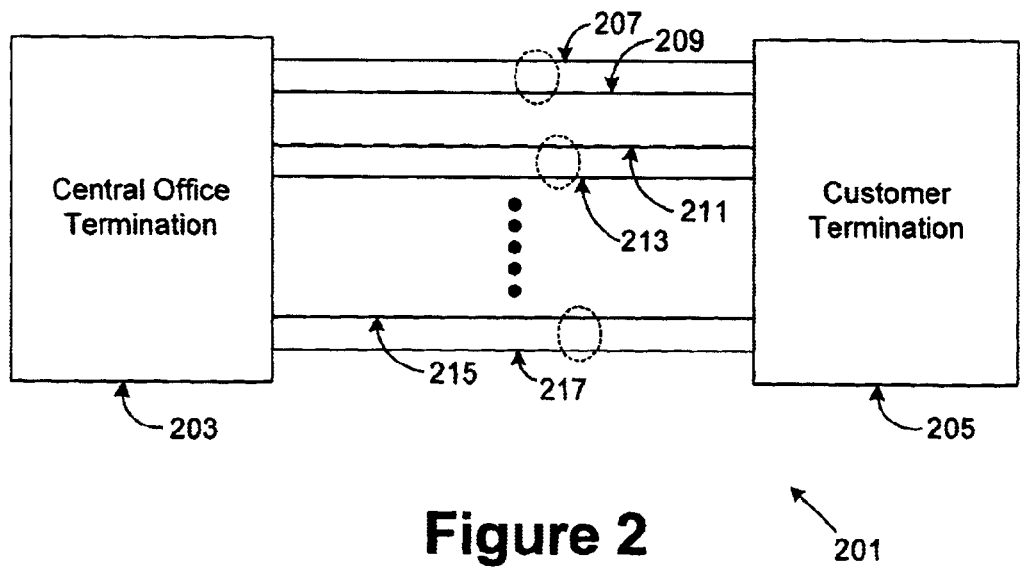
FIG. 2 is a block diagram illustrating a typical DSL data transmission system.

Referring now to FIG. 2, a typical DSL data transmission environment 201 of the prior art is illustrated. The DSL data transmission system may be HDSL, Asymmetric Digital Subscriber Line (ADSL), Symmetric Digital Subscriber Line (SDSL), Very High Speed Digital Subscriber Line (VDSL), or the like, generalized as xDSL (or simply DSL). DSL data transmission environment 201 includes a central office termination 203, a customer termination 205, and several twisted pairs of wires. In the context of this description, each twisted pair is represented by a dashed line loop. Each twisted pair of wires is a circuit that can carry a signal from central office termination 203 to customer termination 205, and/or vice-versa. In the context of this description and as explained above, a central office should not be limited to a telephone company application; it may include any communications environment where at least one twisted pair of wires is used for communication. The wires may be telecommunication wires, such as copper wires, or the like.

With continued reference to FIG. 2, a first twisted pair of wires includes a first wire 207 and a second wire 209. First and second wires 207 and 209 carry a signal from central office termination 203 to customer termination 205, and/or vice-versa. A second twisted pair of wires includes a third wire 211 and a fourth wire 213. Likewise, third and fourth wires 211 and 213 carry a signal from central office termination 203 to customer termination 205, and/or vice-versa. Finally, an $m^{th}$ twisted pair of wires includes a fifth wire 215 and a sixth wire 217, where m can be any number. Similarly, fifth and sixth wires 215 carry a signal from central office termination 203 to customer termination 205, and/or vice-versa. Each of these connections can represent a single DSL end-to-end system.

Typically, DSL data transmission systems include the end modems, which communicate with each other over a local analog loop. Accordingly, the twisted pairs shown in FIG. 2 may be associated with the analog loop. Thus, as shown in FIG. 2, for any number N of wires, N/2 circuits can be created (because each circuit requires a two-wire connection).

Figure 3:
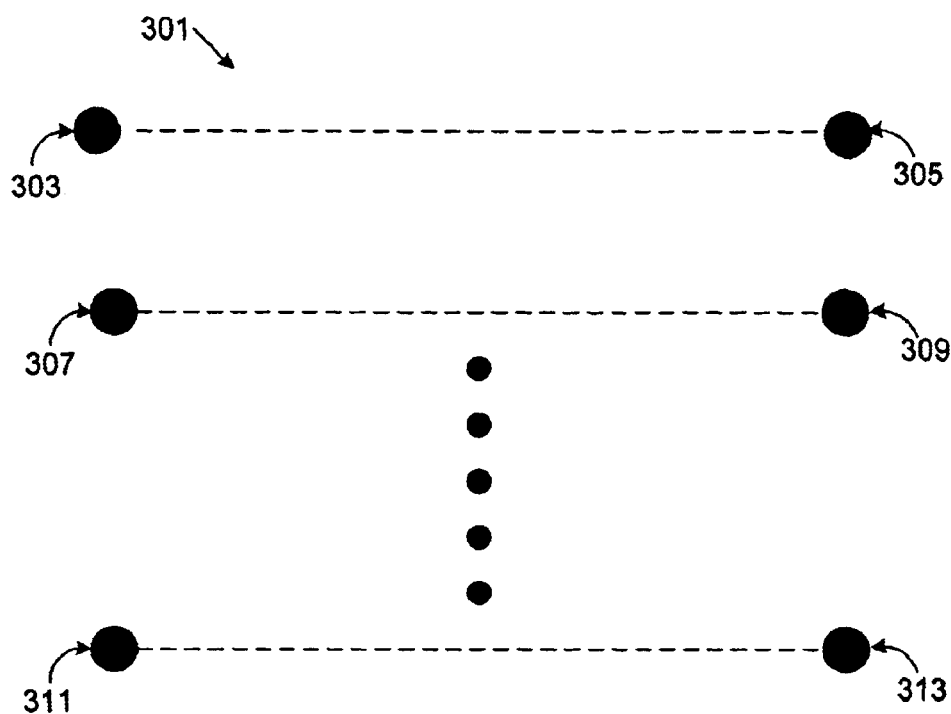
FIG. 3 is a schematic diagram illustrating twisted pair wires.

With reference to FIG. 3, a wiring scheme 301 showing several twisted pairs is illustrated. Wiring scheme 301 includes a first wire 303, a second wire 307, a $k^{th}$ wire 311, a third wire 305, a fourth wire 309, and an $m^{th}$ wire 313, where k and m can be any number. Wiring scheme 301 shows each twisted pair as representing a circuit capable of carrying a signal. The twisted pairs are first wire 303 and third wire 305, second wire 307 and fourth wire 309, and $k^{th}$ wire 311 and $m^{th}$ wire 313. Thus, two wires are used for each twisted pair, i.e., each circuit. Accordingly, for any number N of wires, N/2 circuits can be created.

Figure 4:
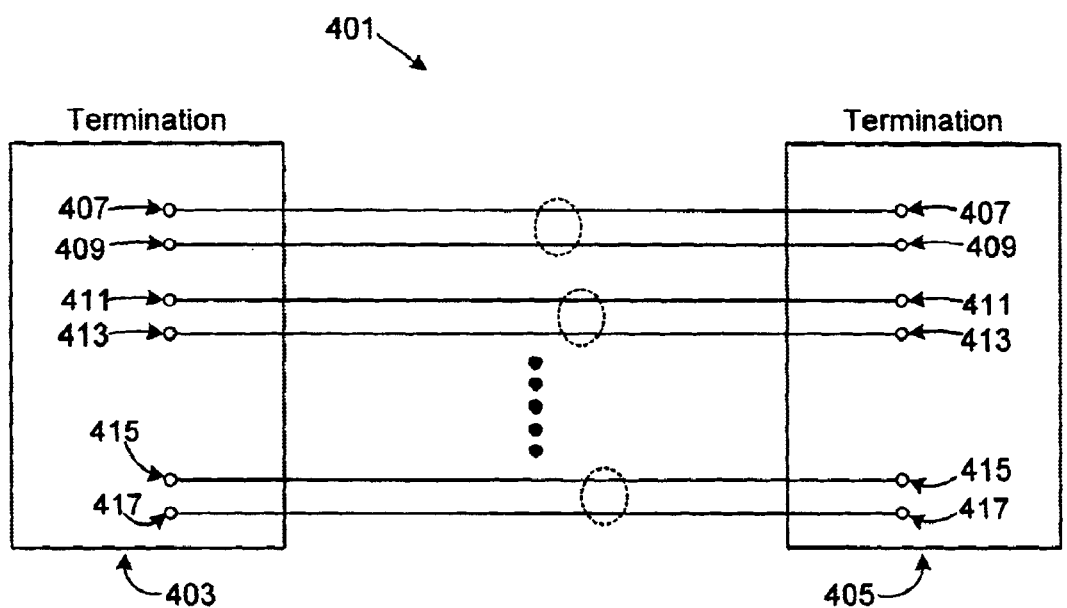
FIG. 4 is a schematic diagram illustrating one wiring arrangement embodiment according to the present invention.

In contrast, the present invention may employ an alternate wiring scheme such that any number N of individual wires can support N−1 distinct lines, channels, and/or circuits. For ease of discussion, lines, channels, and/or circuits may be referred to as simply "lines." In accordance with the present invention, a single wire is preferably designated as the common wire for the N−1 lines that are grouped together. The common wire may act as a reference point for the other N−1 lines. Circuits are then established by utilizing this common wire with each of the other N−1 lines, providing for N−1 lines, circuits, or channels over N wires. In a practical application, only one of the N−1 lines is twisted with the common wire. By way of illustration, FIG. 4 depicts one arrangement of the present invention illustrated by data transmission environment 401. Data transmission environment 401 includes a first termination 403, a second termination 405, a first wire 407, a second wire 409, a third wire 411, a common wire 413, a $k^{th}$ wire 415, and an $m^{th}$ wire 417, where k and m can be any number.

Data transmission environment 401 can include any number of twisted wire pairs, where each pair is represented by a dashed line loop. A first twisted pair includes first wire 407 and second wire 409. A second twisted pair includes third wire 411 and common wire 413. An $m^{th}$ twisted pair includes $k^{th}$ wire 415 and $m^{th}$ wire 417. The twisted pairs transmit data from first termination 403 to second termination 405, and/or vice-versa. For example, first termination 403 may include any communications termination or device where at least one twisted pair of wires is used for communication. In accordance with the present invention, common wire 413 provides the common connection for first wire 407, second 409, third wire 411, $k^{th}$ wire 415, and $m^{th}$ wire 417. In this way, in accordance with the present invention, any number N of wires can support N−1 circuits.

Figure 5:
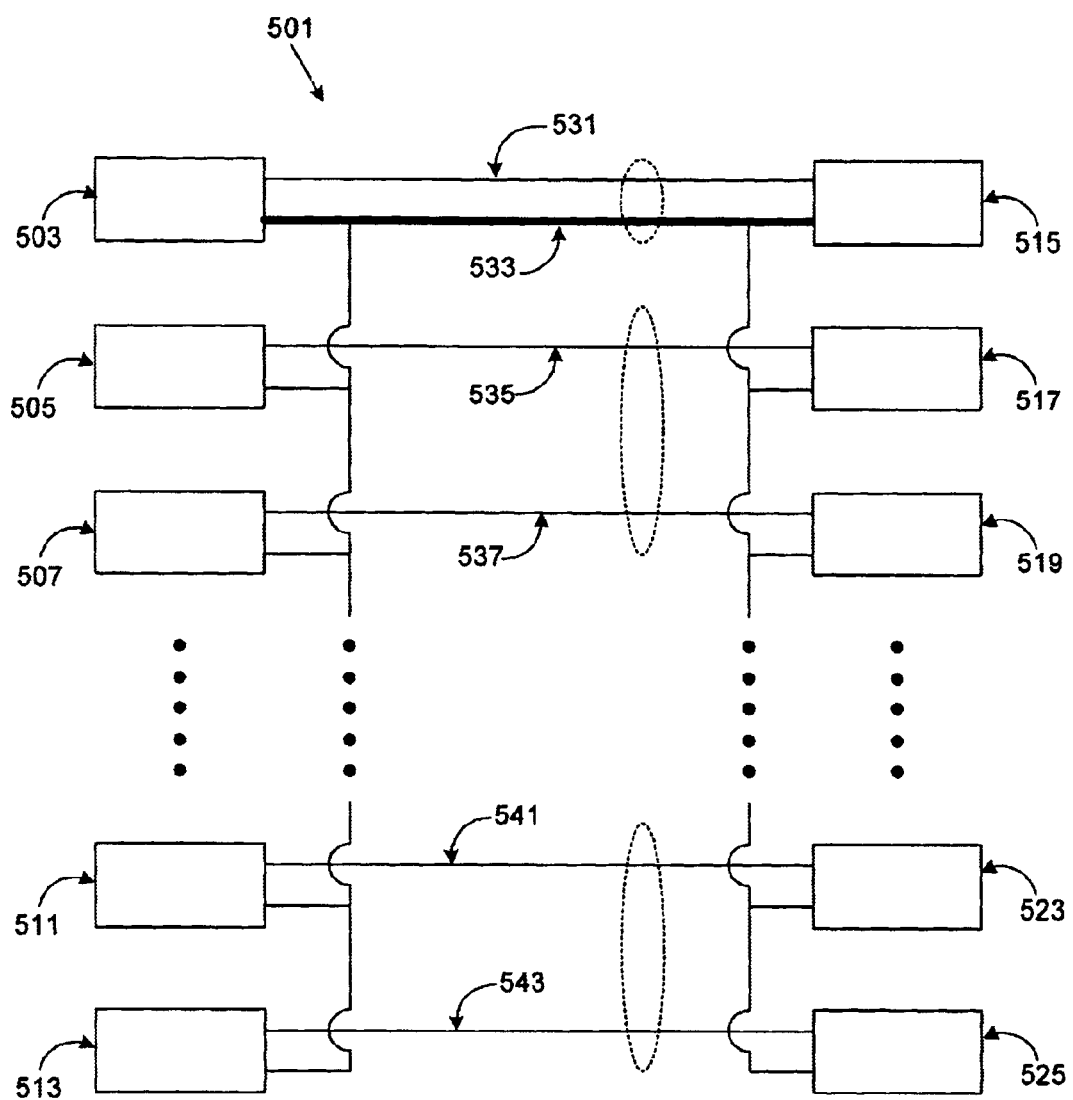
FIG. 5 is a schematic diagram illustrating another wiring arrangement embodiment of the present invention.

Referring now to FIG. 5, another embodiment of the present invention is illustrated in data transmission environment 501. Data transmission environment 501 includes several twisted pairs of wires. A first twisted pair includes a first wire 531 and a common wire 533 which provide communication via a circuit between a first termination 503 and a second termination 515. A second twisted pair includes a third wire 535 and a fourth wire 537. Third wire 535 and common wire 533 provide communication via a circuit between a third termination 505 and a fourth termination 517. Fourth wire 537 and common wire 533 provide communication via a circuit between a fifth termination 507 and a sixth termination 519. In addition, an $m^{th}$ twisted pair includes an $(m-1)^{th}$ wire 541 and an $m^{th}$ wire 543. Common wire 533 and $(m-1)^{th}$ wire 541 provide communication via a circuit between $(m-1)^{th}$ termination 511 and $(m-1)^{th}$ termination 523. Finally, common wire 533 and $m^{th}$ wire 543 provide communication via a circuit between $m^{th}$ termination 513 and $m^{th}$ termination 525.

In accordance with this embodiment of the present invention, the various terminations (reference numbers 503, 515, 505, 517, 507, 519, 511, 523, 513, and 525) may be configured as central office terminations, customer premises terminations, data communications terminations, communications devices (e.g., telephones, modems), or the like. These terminations can be associated with any two points that use wires to communicate. By using common wire 533 as a reference point for the other N−1 wires, N−1 circuits may be created for data transmission.

Figure 6:
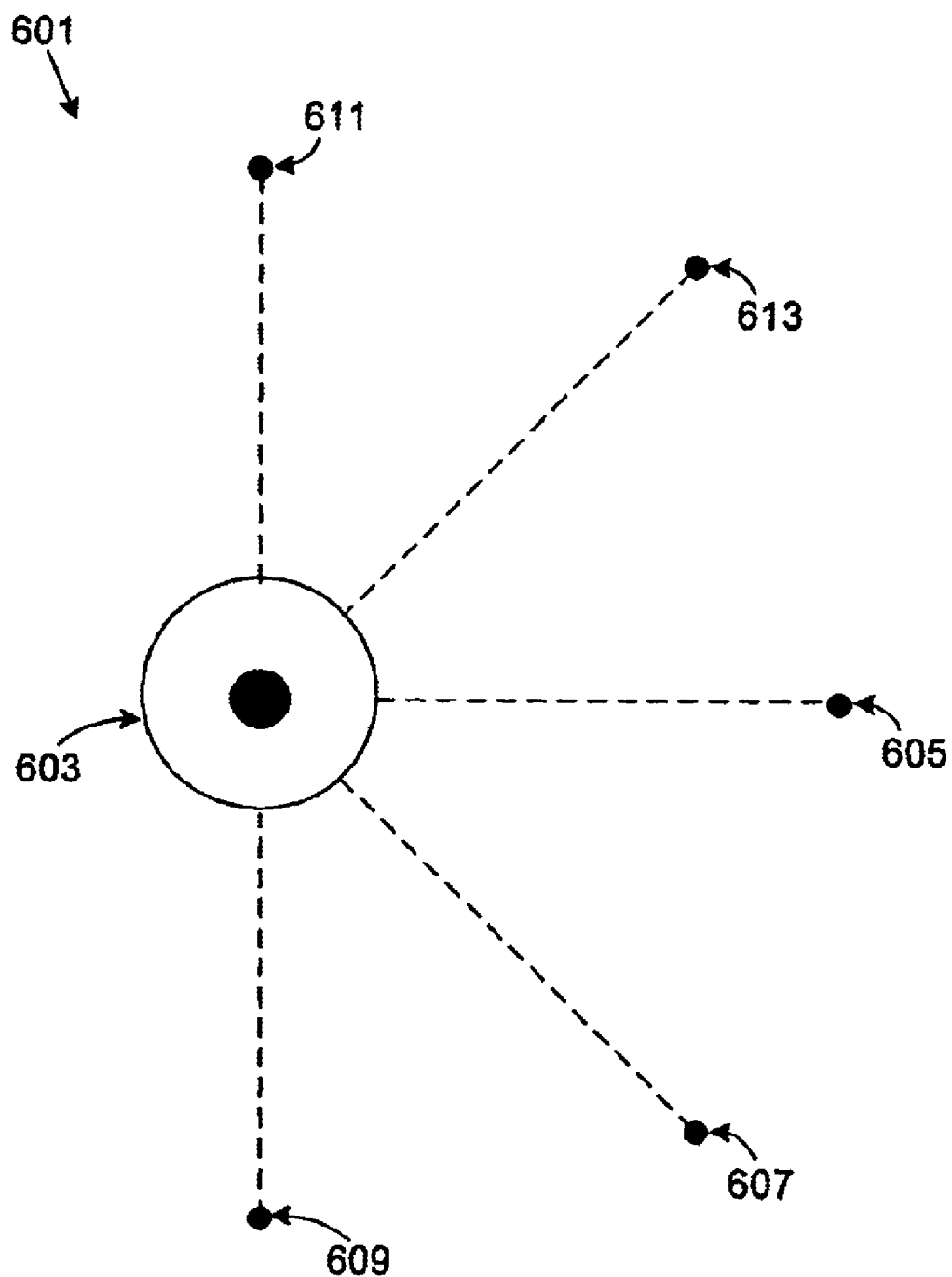
FIG. 6 is a schematic diagram illustrating yet another wiring arrangement embodiment of the present invention.

FIG. 6 depicts one arrangement of the present invention provided by wiring scheme 601 which includes a common wire 603 associated with each of a first, a second, a third, a fourth, and a fifth wire 605, 607, 609, 611, and 613, respectively. Wiring scheme 601 illustrates one embodiment of the present invention for N=6 wires (i.e., three twisted pairs) supporting N−1=5 distinct lines. Accordingly, this embodiment of the present invention makes it possible to transmit data or information over five circuits, instead of merely over three circuits as taught in the past for three twisted pairs. In wiring scheme 601, by effectively designating one of the N lines as the common wire for the other N−1 lines, two additional circuits for data or information transmission are possible (i.e., five distinct lines versus only three distinct lines possible in the past). As explained above, the wiring scheme of the present invention is not limited to only a three twisted pair wiring scheme, as illustrated in FIG. 6. The present invention may be implemented for any number of wires (N) to support N−1 lines.

The assignment of the lines should correlate both at the customer termination (e.g., a communication device, a DSL modem, a personal computer modem, a fax modem, or the like) and at the central office termination (e.g., a communication device, a server, a network, a PSTN, or the like). The assignment of the lines in the present invention may allow for only one of the five lines to be twisted with the common wire (this is a consequence of the conventional POTS twisted pair scheme). In this manner, for example in FIG. 6, the remaining four lines would create two twisted pairs. Consequently, this configuration may increase the cross-talk and losses within the system. In addition, radio interference could further increase the losses. However, the addition of extra lines for data transmission outweighs the system losses by providing increased data rates, as discussed below. Thus, increasing the data rate for transmission provides for transmitting more data or information in a shorter amount of time, which is highly desired.

As the need for faster and faster data transmission grows, technology capable of meeting such a demand while maximizing the use of the existing copper wire loops is desired. One advantage of consolidating the common wire to support N−1 lines is that data transmission is faster. By creating more circuits for data transmission, the speed with which data can be transmitted from one location (e.g., a customer premises) to another location (e.g., a communication device), or vice-versa, is significantly increased. In the context of one practical implementation of the present invention, the total data rate for transmission over two twisted pairs (i.e., four wires) can approach three times the data rate for transmission over a single pair. When individuals at customer premises can transmit data (e.g., by using DSL modems, personal computer modems, fax modems, or the like) at approaching three times the previous data rate, it substantially reduces the time for data transmission. Likewise, the data rate for transmission over three twisted pairs (i.e., six wires) can approach five times the data rate over a single pair. Accordingly, the data rate for transmission over N/2 twisted pairs (i.e., N wires) can approach N−1 times the data rate over a single pair. The data rates approach such values; however, crosstalk and radio interference should be taken into account. Thus, increasing the data rate for transmission allows for transmitting more data in a shorter period of time.

Another advantage of consolidating the common wire to support N−1 lines is that the customer need not pay additional tariffs for the extra circuits created by the wiring scheme of the present invention. In the past, the customer would pay a tariff on N wires (i.e., N/2 twisted pairs) which allows for N/2 circuits. However, by way of the present invention, N wires creates N−1 circuits, instead of merely N/2 circuits as taught in the past. For example, in the past, if the customer paid for three twisted pairs (i.e., N=6 wires), then the customer could use three circuits (i.e., N/2=3). By way of illustration of the present invention, the customer still only pays a tariff for three twisted pairs (i.e., N=6 wires), but N=6 wires creates N−1=5 circuits. Thus, in accordance with the present invention and in the context of this example, by paying the same amount for the tariff, the customer receives, in essence, two "free" circuits. Thus, the present invention can save the customer not only time (as discussed above), but also money.

DC line power from a central office can be supplied to communication devices (e.g., modems) via the twisted pairs. Techniques associated with the generation, regulation, and provision of DC line power, which are well known to those skilled in the art, will not be described in detail herein. Since the twisted pairs sometimes carry DC voltage, overloading of the common wire can occur. For example, POTS requires the application of −48 VDC to the wire pair, wherein the current resulting from this voltage can be detected and used to determine when a phone is off the hook. By way of another example, the voltage and current are sometimes used to power a DSL modem. If all the non-common wires carrying a signal are configured with the same voltage (e.g., a positive voltage) and the common wire is configured with a negative voltage, then the current through the common wire would be the sum of the currents in the other wires. This configuration may overload the common wire. To reduce the likelihood of overloading associated with the common wire, the polarity of the voltage on at least one of the other wires (or circuits) referenced to the common wire can be reversed. In accordance with one embodiment of the present invention, the polarity of the coltage on (N−1)/2 of the wires referenced to the common wire can be reversed. In this way, the currents in the wires of opposite polarity cancel each other and the common wire only needs to carry the amount of current not canceled out. Accordingly, the amount of current flowing through the common wire can be managed by reversing the polarity of an appropriate number of the signal wires. Thus, providing opposite polarity DC voltages on one or more of the non-common wires substantially reduces the current carried in the common wire.

Figure 7:
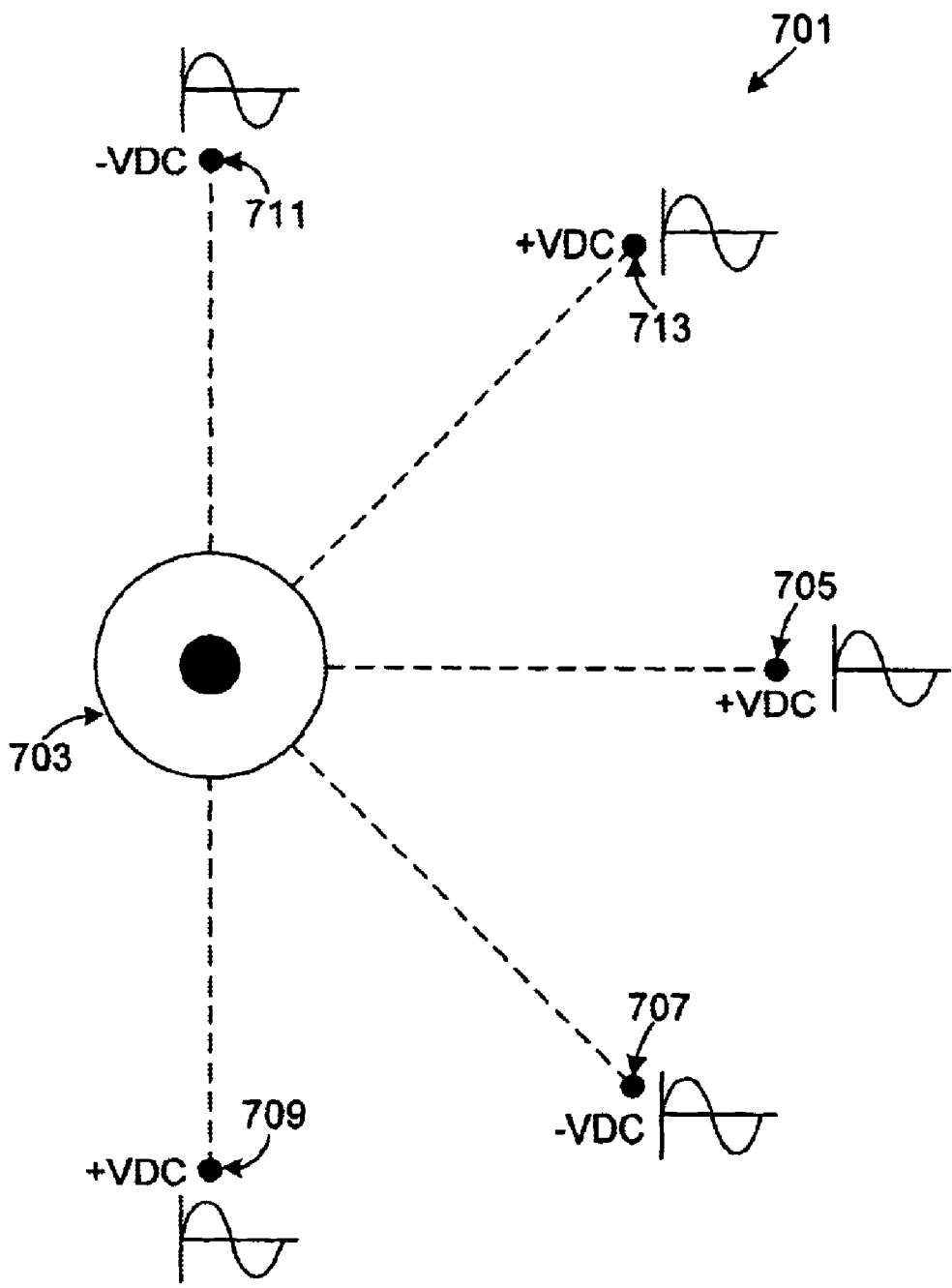
FIG. 7 is a schematic diagram illustrating another wiring arrangement embodiment of the present invention wherein the DC voltage polarities and/or phases are reversed.

In an exemplary configuration (as shown in FIG. 7), first, third, and fifth lines 705, 709, and 713 may utilize a positive voltage (e.g., +110 VDC referenced to the common wire) while second and fourth lines 707 and 711 may utilize a negative voltage (e.g., −110 VDC referenced to the common wire). In addition, if currents through the five circuits are not equal, then the circuit with the largest current draw should be chosen as the positive voltage (e.g., +110 VDC). Therefore, reversing the flow on an appropriate number of the signal wires reduces the flow in common wire 703 in order to reduce the likelihood of overloading. In this example, common wire 703 would only carry the current of about one of the positive voltages, because the other currents would substantially cancel out.

A similar technique may also be used if AC power is supplied over the wires, providing that the AC power is frequency synchronized. For example, to reduce the current flow in the common wire, the phase of the AC signal on one or more wire pairs can be inverted by 180 degrees. Such a difference in phase may have a similar current canceling effect as described above for DC power. By way of illustration, as shown in FIG. 7, first, third, and fifth lines 705, 709, and 713 may utilize a zero phase voltage as referenced to the common wire while second and fourth lines 707 and 711 may utilize a 180 degrees difference in phase voltage as referenced to the common wire. Such a configuration reduces the current flow in common wire 703 in order to reduce the likelihood of overloading.

Overall, the present invention provides novel and elegant use for wires in the context of a data communication system. By designating a common wire to support a plurality of lines, then more lines transmit data to provide much desired higher data rates.

Although the invention has been described herein with reference to the appended drawing figures, it will be appreciated that the scope of the invention is not so limited. Various modifications in the design and implementation of various components and method steps discussed herein may be made without departing from the spirit and scope of the invention, as set forth in the appended claims.

What is claimed is:

1. A wiring scheme for a data transmission system, comprising:
   a number N of telecommunication wires for use by a data communication device;
   N−1 of said telecommunication wires designated to each carry a data transmission signal associated with said data communication device;
   one of said N telecommunication wires, other than said N−1 wires, designated as a common wire with respect to each of said N−1 wires; and
   said common wire and said N−1 wires configured to create N−1 circuits.

2. The wiring scheme of claim 1, wherein at least one of said N−1 wires have opposite polarity DC voltages.

3. The wiring scheme of claim 1, wherein at least one of said N−1 wires has a positive DC voltage referenced to said common wire and at least one of said N−1 wires has an equal but negative DC voltage referenced to said common wire.

4. The wiring scheme of claim 3, wherein said positive DC voltage is approximately +110 VDC and said negative DC voltage is approximately −110 VDC.

5. The wiring scheme of claim 1, wherein said N wires transmit data at a rate approaching N−1 times the data rate of a single twisted pair.

6. The wiring scheme of claim 1, wherein a first one of said N−1 wires carries a first AC voltage and a second one of said N−1 wires carries a second AC voltage that is out of phase with said first AC voltage.

7. A method for using telecommunication wires for data transmission, said method comprising the steps of:
   providing N telecommunication wires for use by a data communication device;
   designating N−1 of said telecommunication wires to carry N−1 data transmission signals associated with said data communication device;
   designating one of said telecommunication wires, other than said N−1 wires, as a common wire with respect to each of said N−1 wires; and
   configuring said common wire and said N−1 wires to create N−1 circuits.

8. The method of claim 7, further comprising the steps of:
   applying a positive DC voltage, relative to a voltage on said common wire, to a first one of said N−1 wires; and
   applying a negative DC voltage, relative to said voltage on said common wire, to a second one of said N−1 wires.

9. The method of claim 8, wherein said positive voltage and said negative voltage are substantially equal in magnitude.

10. The method of claim 7, further comprising the steps of:
    applying a first AC voltage to a first one of said N−1 wires; and
    applying a second AC voltage to a second one of said N−1 wires, where said second AC voltage is out of phase with said first AC voltage.

11. The method of claim 7, further comprising the step of transmitting data for N wires at a rate approaching N−1 times the data rate of a single twisted pair.

12. The method of claim 7, further comprising the step of carrying different signals on at least two of said N−1 wires.

13. A data transmission system, comprising:
    a first communications termination;
    a second communications termination; and
    a data communication wiring scheme for facilitating communication between said first and second communications terminations, including:
      a number N of telecommunication wires for data transmission between said first and second communications devices;
      N−1 of said telecommunication wires designated to each carry a data transmission signal;
      one of said N telecommunication wires, other than said N−1 wires, designated as a reference wire with respect to each of said N−1 wires; and
      said common wire and said N−1 wires configured to create N−1 circuits.

14. The data transmission system of claim 13, wherein said data communication wiring scheme is capable of supporting at least one of a POTS data transmission, a POTS voice transmission, a PSTN data transmission, a DSL data transmission, a personal computer modem data transmission, a facsimile modem data transmission, and an ISDN data transmission.

15. The data transmission system of claim 13, wherein said first and second communications devices comprise at least one of DSL modems, personal computer modems, and facsimile modems.

16. The data transmission system of claim 13, wherein at least one of said first and second communications devices comprises a plurality of communications devices.

17. The data transmission system of claim 13, wherein:
    a first one of said N−1 wires carries a positive DC voltage, relative to a voltage on said common wire; and
    second one of said N−1 wires carries a negative DC voltage, relative to said voltage on said common wire.

18. The data transmission system of claim 13, wherein:
    a first one of said N−1 wires carries a first AC voltage; and
    a second one of said N−1 wires carries a second AC voltage, where said second AC voltage is out of phase with said first AC voltage.

* * * * *

UNITED STATES PATENT AND TRADEMARK OFFICE
CERTIFICATE OF CORRECTION

PATENT NO.    : 6,678,375 B1
DATED         : January 13, 2004
INVENTOR(S)   : Henderson et al.

It is certified that error appears in the above-identified patent and that said Letters Patent is hereby corrected as shown below:

Column 3,
Line 31, after "vice-versa", add -- . --.

Column 4,
Line 19, between "second" and "409, insert -- wire --.
Line 20, replace "coltage" with -- voltage --.

Column 8,
Line 47, insert -- a -- before "second".

Signed and Sealed this

Twenty-eighth Day of September, 2004

JON W. DUDAS
*Director of the United States Patent and Trademark Office*